(12) United States Patent
Aldrich et al.

(10) Patent No.: US 7,941,299 B1
(45) Date of Patent: May 10, 2011

(54) VERIFICATION AND VALIDATION SYSTEM FOR A GRAPHICAL MODEL

(75) Inventors: William J. Aldrich, Natick, MA (US); Gregoire Hamon, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 545 days.

(21) Appl. No.: 11/970,689

(22) Filed: Jan. 8, 2008

(51) Int. Cl.
*G06F 17/50* (2006.01)
*G06F 7/60* (2006.01)
*G06F 9/44* (2006.01)

(52) U.S. Cl. .................. 703/1; 703/2; 717/104
(58) Field of Classification Search .............. 703/1, 2; 717/104
See application file for complete search history.

(56) References Cited

U.S. PATENT DOCUMENTS

| | | | |
|---|---|---|---|
| 5,544,066 A * | 8/1996 | Rostoker et al. | 716/18 |
| 6,269,467 B1 * | 7/2001 | Chang et al. | 716/1 |
| 6,587,995 B1 * | 7/2003 | Duboc et al. | 716/4 |
| 6,760,894 B1 * | 7/2004 | Yalcin et al. | 716/6 |
| 7,386,827 B1 * | 6/2008 | Zhu et al. | 716/16 |
| 2003/0018945 A1 * | 1/2003 | Foster et al. | 716/5 |
| 2005/0172239 A1 * | 8/2005 | Liu et al. | 715/763 |
| 2006/0064669 A1 * | 3/2006 | Ogilvie et al. | 717/106 |

OTHER PUBLICATIONS

Chang et al, "Catching Design Bugs Using Analog/Mixed-Signal/RF Verification", Aug. 3, 2006, 10 pages, http://www.cdnusers.org/Portals/0/cdnlive/na2006/alternate/145_paper.pdf.*

* cited by examiner

*Primary Examiner* — David Silver
(74) *Attorney, Agent, or Firm* — Harrity & Harrity, LLP

(57) ABSTRACT

A verification tool in a graphical modeling environment allows the components in the graphical modeling environment to be used to define error or exceptional conditions without adverse affects on the ultimate implementation of the model. In one example, a system presents a graphical interface to facilitate design of a model constructed from graphical blocks; receives an association of a plurality of blocks with a verification subsystem; and performs an operation to verify that the blocks in the verification subsystem do not affect operation of the model external to the verification system.

24 Claims, 10 Drawing Sheets

VERIFICATION AND VALIDATION SYSTEM FOR A GRAPHICAL MODEL

BACKGROUND

Technical computing environments are known that present a user, such as a scientist or engineer, with an environment that enables efficient analysis and generation of technical applications. In the MATLAB® technical computing environment, for example, users may perform advanced analyses, visualize data, and develop algorithms. Ideally, a technical computing environment will enable a technical researcher or designer to efficiently and quickly perform tasks such as research and product development.

Existing technical computing environments may be implemented as or run in conjunction with a graphically-based environment. For example, in one existing graphically-based technical computing environment, models may be built by connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail.

When using graphical modeling tools, it may be desirable to view the state of or monitor particular intermediate points in the model without affecting the operation of the model for the purpose of verification and debugging. For example, it may be desirable to monitor the model for possible error or fault conditions. Existing modeling environments include specialized primitive elements that can be inserted into the model to indicate errors or other exceptional conditions in the model. These specialized verification elements are designed to not influence or affect the operation of the underlying model.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
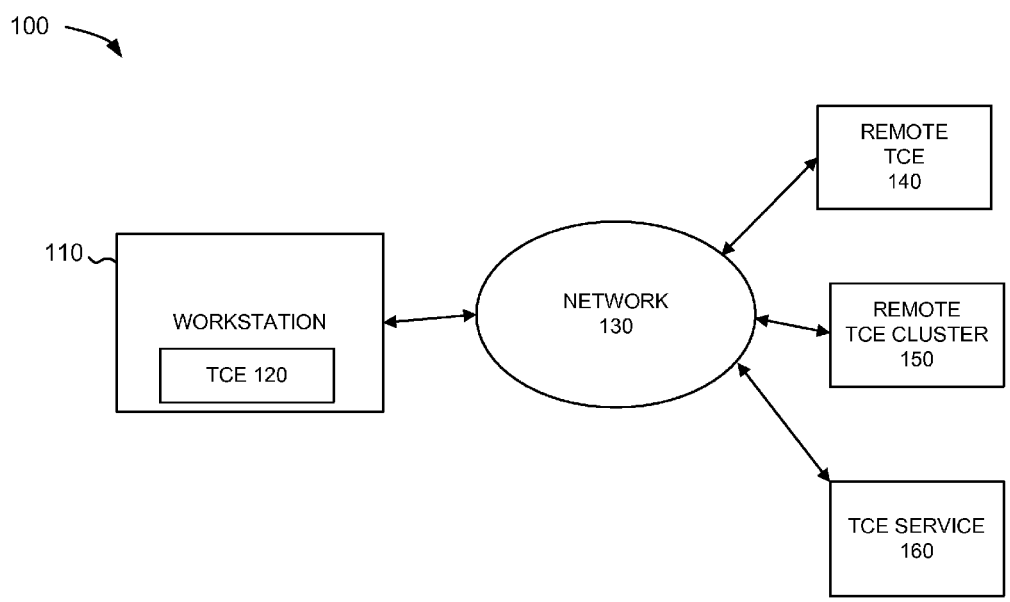
FIG. 1 is an exemplary diagram of a workstation in which concepts described herein may be implemented.

The following detailed description refers to the accompanying drawings. The same reference numbers in different drawings may identify the same or similar elements. Also, the following detailed description does not limit the invention.

Overview

Implementations described herein relate to a technical computing environment in which users may construct graphic models. A verification or consistency check operation may be provided to assist users in verifying that a model is behaving correctly and completely. The verification operation may use substantially any of the primitive elements (e.g., graphical blocks) available to users of the technical computing environment. That is, a user may assemble a verification subsystem with either primitive elements designed specifically for verification or with other more general primitive elements or with other higher level model constructs. The verification operation may guarantee that any primitive elements and/or higher level model constructs within the verification subsystem do not influence the output of the model and do not affect any code generated to implement the model.

DEFINITIONS

A "technical computing environment," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a technical computing environment may include a dynamically-typed programming language (e.g., the M language) that can be used to express problems and/or solutions in mathematical notations. For example, a technical computing environment may use an array as a basic element, where the array may not require dimensioning. In addition, a technical computing environment may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A technical computing environment may further provide mathematical functions and/or graphical tools or blocks (e.g., for creating plots, surfaces, images, volumetric representations, etc.). In one implementation, a technical computing environment may provide these functions and/or tools using toolboxes (e.g., toolboxes for signal processing, image processing, data plotting, parallel processing, etc.). In another implementation, a technical computing environment may provide these functions as block sets. In still another implementation, a technical computing environment may provide these functions in another way, such as via a library, etc.

A technical computing environment may be implemented as a text-based environment (e.g., MATLAB®; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

System Description

FIG. 1 is an exemplary diagram of a system 100 in which concepts described herein may be implemented. The system may include a personal computer or workstation 110. Workstation 110 execute a technical computing environment (TCE) 120 that presents a user with an interface that enables efficient analysis and generation of technical applications. For example, the TCE may provide a numerical and/or symbolic computing environment that allows for matrix manipulation, plotting of functions and data, implementation of algorithms, creation of user interfaces, and/or interfacing with programs in other languages.

Workstation 110 may operate as a single detached computing device. Alternatively, workstation 110 may be connected to a network 130, such as a local area network (LAN) or wide area network (WAN) such as the Internet. When workstation 110 is connected to a network, TCE 120 may be run by multiple networked computing devices or by one or more remote computing devices. In such an implementation, the TCE may be executed in a distributed manner, such as by executing on multiple computing devices simultaneously. Additionally, in some implementations, the TCE may be executed over a network 130 in a client-server relationship. For example, workstation 110 may act as a client that communicates with, using a web browser, a server that stores and potentially executes the TCE program.

For example, as shown in FIG. 1, system 100 may include a remote TCE 140 (e.g., a remotely located computing device running a TCE), a remote TCE cluster 150, and/or a TCE service 160. Remote TCE cluster 150 may include multiple computing devices that run TCEs that execute in a distributed or parallel manner. TCE service 160 may include a server computing device that provides a TCE as a remote service. For instance, a TCE may be provided as a web service. The web service may provide access to one or more programs (e.g., TCE) provided by TCE service 160. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., workstation 110) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

Figure 2:
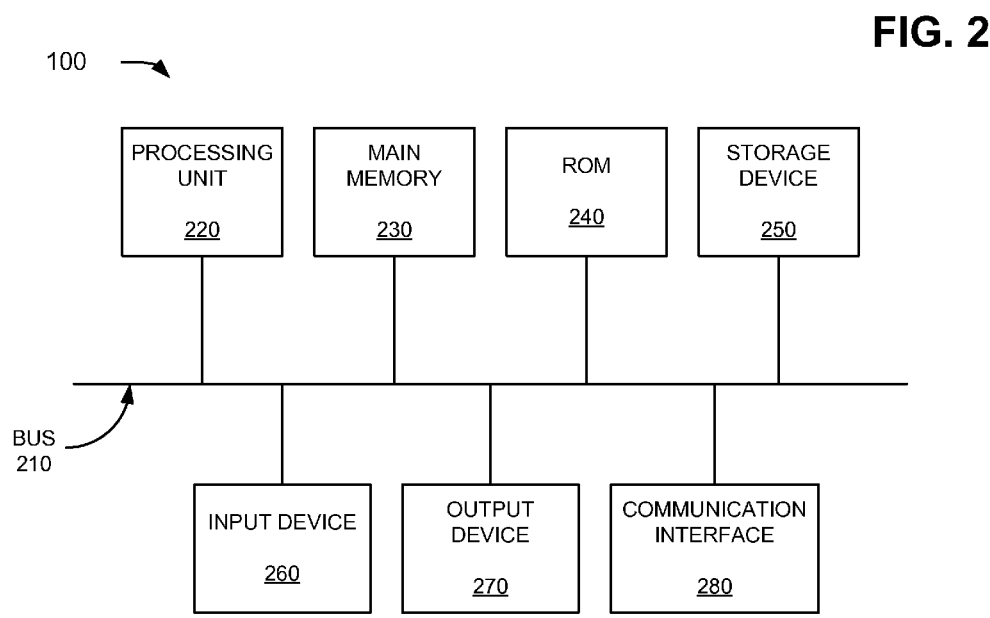
FIG. 2 is a diagram of an exemplary device corresponding to the workstation of FIG. 1.

FIG. 2 is a diagram of an exemplary device corresponding to workstation 110. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to workstation 110, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables workstation 110 to communicate with other devices and/or systems. For example, communication interface 280 may include mechanisms for communicating with another device or system via a network.

As will be described in detail below, workstation 110 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

The computer-readable medium may particularly include a technical computing environment. The TCE may include any of the features defined above with respect to the term "technical computing environment." For example, in one implementation, the technical computing environment may include MATLAB® software that provides a variety of mathematical functions and/or graphical tools.

Although FIG. 2 shows exemplary components of workstation 110, in other implementations, workstation 110 may contain fewer, different, or additional components than depicted in FIG. 2. In still other implementations, one or more components of workstation 110 may perform one or more tasks performed by one or more other components of workstation 110.

Technical Computing Environment

Figure 3:
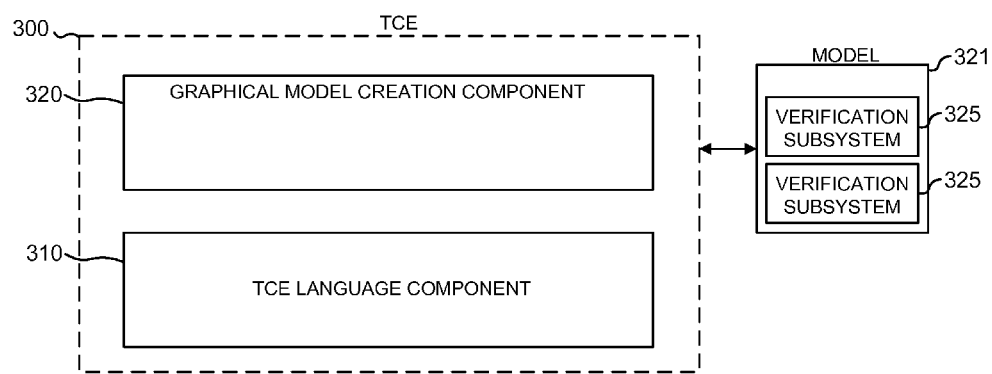
FIG. 3 is a diagram illustrating functional components of a technical computing environment (TCE)

FIG. 3 is a diagram illustrating functional components of a technical computing environment (TCE) 300. As mentioned, TCE 300 may include a program stored on a computer-readable medium, such as main memory 230 or ROM 240 in workstation 110. In other implementations, TCE 300 may be associated with another device separate from workstation 110, and may accessed by workstation 110 via communication interface 280 and a network. In yet other implementations, all or part of TCE 300 may be implemented in hardware.

TCE 300 may include a TCE language component 310 and a graphical model creation component 320. TCE language component 310 may generally function to implement a technical computing language. TCE language component 310 may, for example, provide an interface that integrates computation, visualization, and programming in a relatively easy-to-use environment where problems and solutions can be expressed in mathematical notation familiar to technical users.

Graphical model creation component 320 may include software for modeling, simulating, and/or analyzing dynamic systems. Graphical model creation component 320 may, for instance, support linear and nonlinear systems, models in continuous time, sampled time, or a hybrid of the two. Systems modeled with graphical model creation component 320 may be constructed using a graphical interface that allows the user to arrange blocks that represent functionality and/or data. Graphical model creation component 320 may additionally allow users to execute or run the created model and to view and analyze results of the model.

In general, graphical model creation component 320 can be used to graphically generate designs (i.e., models) that simulate the behavior of the design. The models may be used to facilitate communication, peer-review, and iterative refinement with visual representations that simplify understanding. Graphical model creation component 320 may include specialized blocks that can define error or fault conditions and that can be used to identify design flaws.

As shown in FIG. 3, graphical model creation component 320 may be used to generate a model 321 that includes one or more verification subsystems 325. Each verification subsystem 325 may include one or more primitive elements and/or higher level model constructs that define desired behavior of the model (i.e., whether the model is behaving correctly and completely). Additionally, graphical model creation component 320 may guarantee that any primitive elements and/or higher level model constructs within a verification subsystem 325 do not influence the output of model 320 and do not affect any code generated to implement model 320. Aspects of graphical model creation component 320 relating to verification subsystems 325 will be described in more detail below.

Before describing the operation of graphical model creation component 320 in additional detail, it will be helpful to describe an exemplary model generated with graphical model creation component 320.

Figure 4:
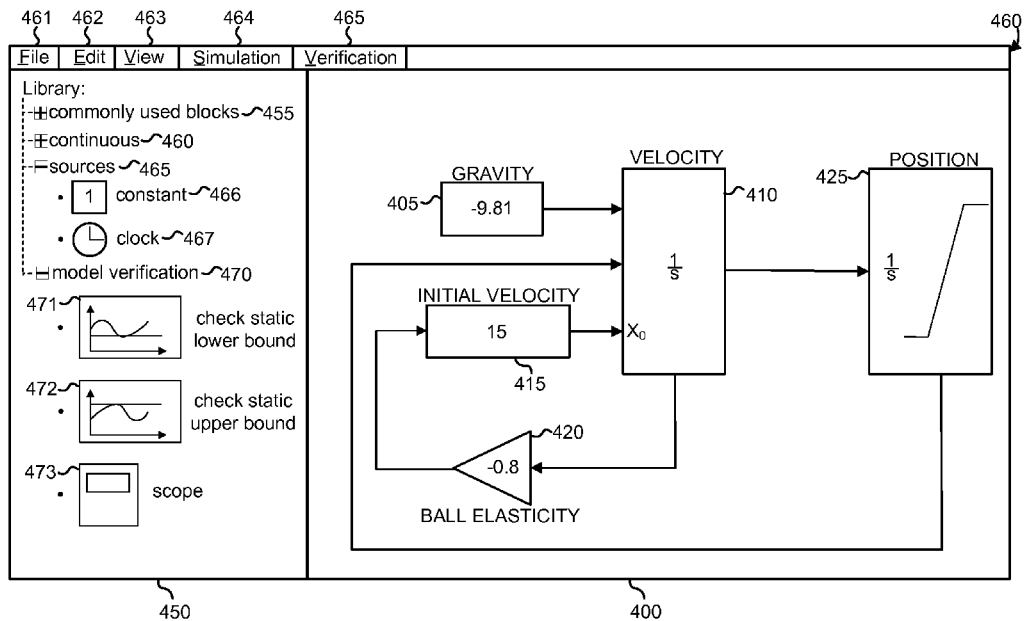
FIG. 4 is a diagram illustrating an exemplary graphical interface in which a model may be generated with a graphical model creation component.

FIG. 4 is a diagram illustrating an exemplary graphical interface in which a model may be generated with graphical model creation component 320. The graphical interface may include a model area 400 in which a model (e.g., constructed of blocks) can be built by a user. A library area 450, which will be referred to as "library 450" herein, and a menu bar 460 are also shown as included in the graphical interface.

Library 450 may include one or more primitive elements or higher level model constructs, called blocks herein, that a user may select and place in model area 400. The blocks included in library 450 may be provided with TCE 300 and/or may be created by users of TCE 300. Library 450 may be organized as a number of sub-libraries that each stores a set of related blocks. As shown in FIG. 4, library 450 may include a commonly used blocks library 455, a continuous library 460, a sources library 465, and a model verification library 470. Sources library 465 and model verification library 470 are shown in an expanded view such that the blocks contained in these libraries are illustrated.

Sources library 465, for instance, may include a constant block 466 and a clock block 467. Constant block 466 may be a block designed to output a signal having a constant, user-settable value. Clock block 467 may be a block designed to output a clock signal.

Model verification library 470 may include a number of model verification blocks that may be specifically designed to provide verification for a model. Three exemplary model verification blocks are illustrated in FIG. 4. These blocks include: a check static lower bound block 471, a check static upper bound block 472, and a scope block 473. Check static lower bound block 471 and check static upper bound block 472 may be used to monitor whether a signal level at a particular node in a model goes below (block 471) or above (block 472) a preset level. These blocks may, for example, generate an error condition or a log event if this happens. Scope block 473 may allow a user to graphically plot the signal(s) at a particular node in a model.

Menu bar 460 may include a number of graphically selectable menu options, such as a file menu option 461, an edit menu option 462, a view menu option 463, a simulation menu option 464, and a verification menu option 465. Each menu option may correspond to, for example, a user-selectable command or a sub-menu with additional commands.

Consistent with aspects described herein, verification menu option 465 may be used to control graphical model creation component 320 to perform operations relating to verification. For example, a user may use verification menu option 465 to select one or more blocks for inclusion in a verification subsystem. Blocks included in a verification subsystem may be automatically analyzed by graphical model creation component 320 (FIG. 3) to ensure that the blocks do not influence the output of a model or affect any code generated when implementing the model. In alternate implementations, other methods, such as a right-click context menu or a block in library 450, may be used to interact with graphical model creation component 320.

In the example of FIG. 4, model area 400 includes a model simulating the behavior of a ball dropped from an initial height. The model may include a number of blocks 405, 410, 415, 420, and 425. Each of blocks 405-425 may define elements from which a model may be built. A block may represent functionality and/or data and may be defined using any of a number of possible programming languages. A block may also itself be defined by one or more other blocks.

The model shown in FIG. 4 may have been generated by a user placing each of blocks 405 through 425 in model area 400, connecting inputs and outputs of the blocks to create logical connections between the blocks, and configuring parameters relating to the blocks.

As shown in FIG. 4, a constant block 405 may be used to represent the constant acceleration due to gravity (−9.81). Block 415 may represent the initial velocity of the ball (e.g., 15 meters/second in this example). Lines may be connected from blocks 405 and 415 to block 410, indicating that the outputs of blocks 405 and 415 may be inputs to block 410. Blocks 410 and 425 may be integrator blocks which have been labeled "velocity" and "position," respectively, and the output of these blocks may represent the velocity and position of the ball. The output of block 420 may be input to block 415 and the output of block 425 may be fed back to block 410. A second output of block 410 may be input to gain block 420, which is labeled as ball elasticity. The output of gain block 420 may modify initial velocity block 415.

A user, after constructing the model represented by blocks 405 through 425, may instruct, via simulate menu option 464, graphical model creation component 320 to simulate (e.g., run) the model, which may cause graphical model creation component 320 to implement the system defined by blocks 405 through 425. The user may wish to validate or verify the operation of the model using graphical model creation component 320. For example, the user may place an instance of scope block 473 in model area 400 and may connect an input of the scope block to an output of one of blocks 405 through 425. Scope block 473 may act as a virtual oscilloscope that may allow the user to visualize the signal to which it is connected.

As mentioned previously, verification subsystems 325 may be used by TCE 300 to verify the correct operation or behavior of a model. A user may, for instance, design a verification system to test one or more aspects of the model. For example, a verification subsystem may be used to monitor whether certain signals within a model exceed threshold values or take on error conditions. In general, any of a number of known techniques can be used to verify correct behavior of a model.

Figure 5:
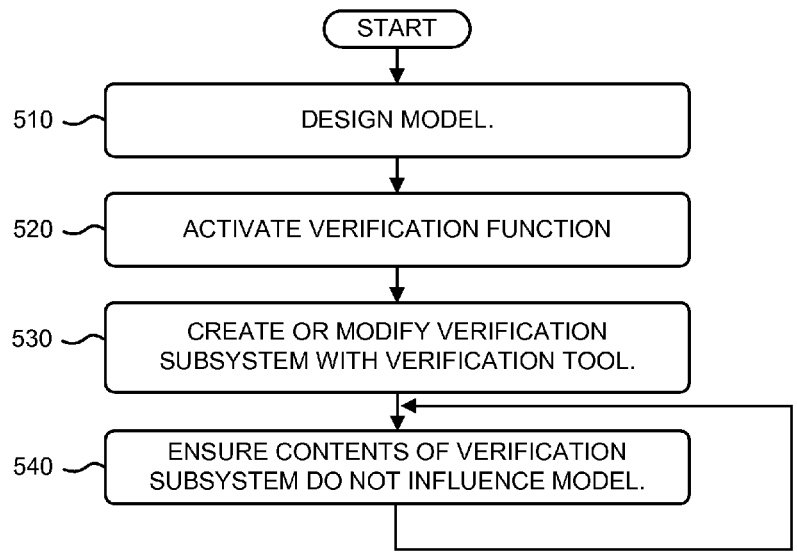
FIG. 5 is a flow chart illustrating an exemplary process for operation of the graphical model creation component shown in FIG. 3.

Additionally, consistent with aspects described herein, TCE 300 may ensure that one or more designated verification primitives or other model blocks, when placed in a designated verification subsystem 325, do not influence the output of the model. FIG. 5 is a flow chart illustrating the operation of graphical model creation component 320 in the context of verification subsystems 325.

A user may design a model using graphical creation component 320 (act 510). As discussed above, in one implementation, the user may design the model by manipulating blocks (i.e., primitive model elements or constructs of multiple primitive model elements) in a graphical interface. At some point, such as either during creation or after creation of the model, the user may activate via, for example, verification menu option 465, a verification function of graphical model creation component 320 (act 520). In one implementation, when selected, the verification function may allow the user to select blocks that are to be grouped together or otherwise associated with one another as a group of blocks (act 530) that define a verification subsystem that will be used to verify correct behavior of the model. For example, graphical model creation component 320 may allow the user to select multiple blocks by clicking on each block using a mouse. As each block is selected, it may be added to the verification subsystem. Similarly, a user may remove blocks from a verification subsystem by, for example, selecting one or more blocks in a remove operation. In this manner, the user can create verification subsystems that include arbitrary groupings of blocks. Act 530 will be described in more detail below with reference to FIG. 7.

The blocks selected by the user as being included in a verification subsystem may generally include any block in the model. Blocks that are designed specifically as verification and validation blocks or primitives, such as blocks in model verification library 470 may be added to the verification subsystem. Additionally, blocks that are not specifically designed for verification and validation, such as blocks in continuous library 460 and sources library 465, may be similarly added to the verification subsystem.

Figure 6:
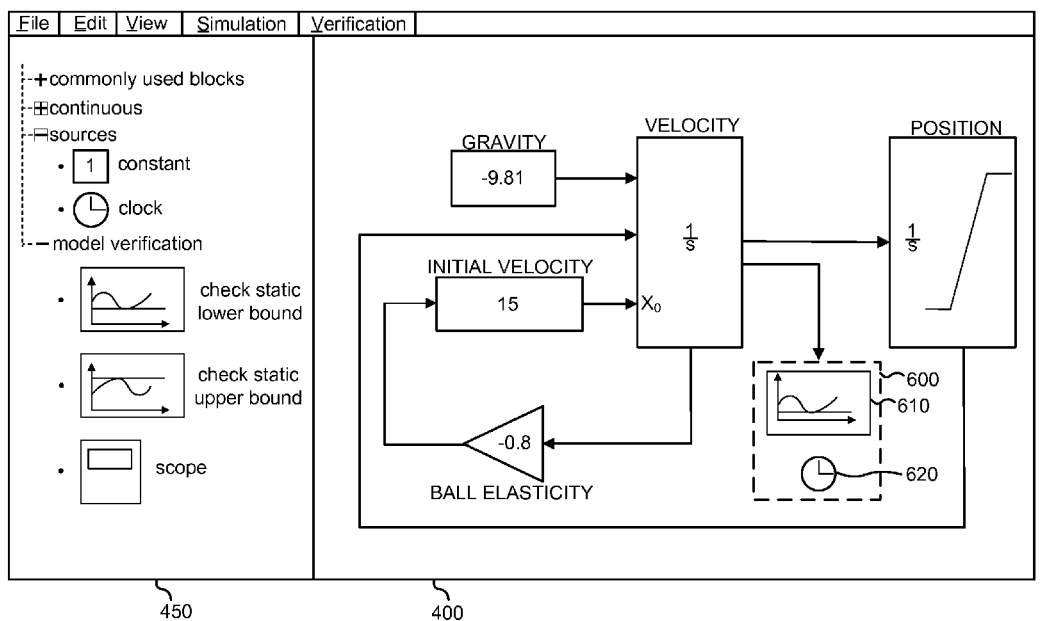
FIG. 6 is a diagram of an exemplary user interface illustrating a verification subsystem defined for a model.

FIG. 6 is a diagram of an exemplary user interface illustrating a verification subsystem 600 defined for a model. The model in the example of FIG. 6 is identical to that shown in FIG. 4, except that a verification subsystem 600 is also included. Verification subsystem 600 may include a check static lower bound block 610 and a clock block 620. Assume that the user, after or during creation of the model, decided to add check static lower bound block 610 and clock block 620. The user may add these blocks to the model and configure parameters for these blocks. The user may then, via, for example, verification menu option 465, indicate that these blocks are to be included in verification subsystem 600. The fact that a number of blocks correspond to a particular verification subsystem may be graphically shown to the user. For example, as shown in FIG. 6, a dashed box surrounds static lower bound block 610 and clock block 620. Other methods for graphically showing that blocks correspond to a particular verification subsystem could also be used. For example, blocks in a particular verification subsystem may be given a distinctive color, font, or other visual indicator.

Figure 7:
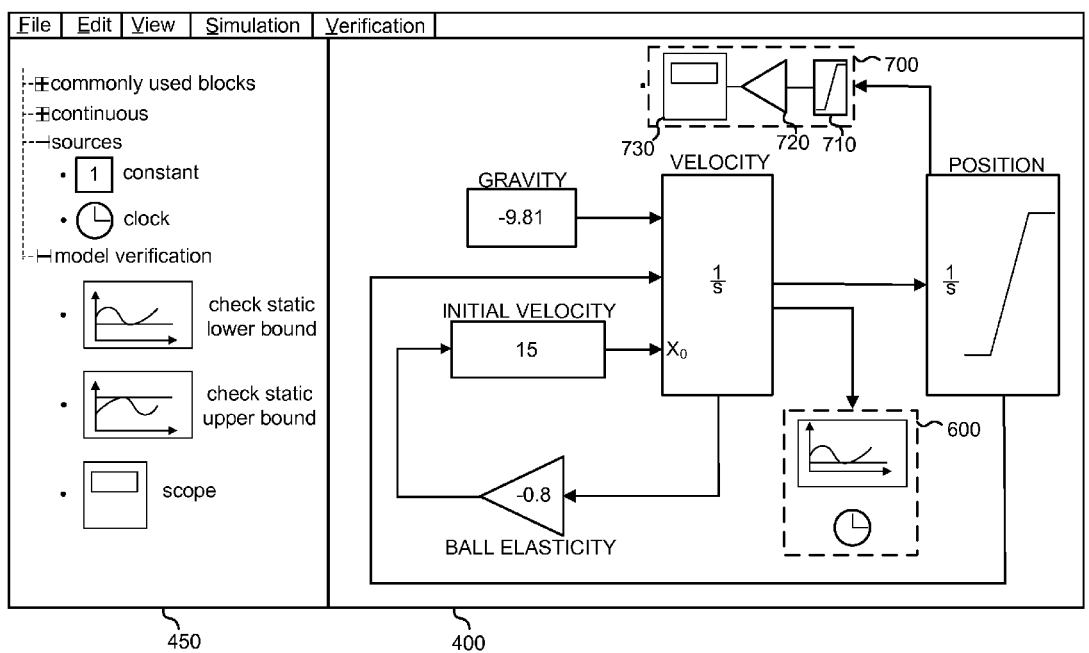
FIG. 7 is a diagram of an exemplary user interface illustrating multiple verification subsystems defined for a model.

FIG. 7 is a diagram of an exemplary user interface illustrating verification subsystems 600 and 700 defined for a model. In this example, the model illustrated is identical to that shown in FIG. 6, except that an additional verification subsystem 700 is included. Verification subsystem 700 may include an integrator block 710, a gain block 720, and a scope block 730. Verification subsystem 700 may be handled by graphical model creation component 320 as a verification subsystem distinct from verification subsystem 600.

Referring back to FIG. 5, graphical model creation component 320 may ensure that the contents of a verification subsystem do not influence the output of the model (act 540). Graphical model creation component 320 may, in response to a user command, generate output code that implements a model. Graphical model creation component 320 may, in some implementations, additionally ensure that the contents of a verification subsystem do not influence the output code.

Graphical model creation component 320 may check to ensure that the contents of a verification subsystem do not influence the output of the model at a number of different possible times. For example, graphical model creation component 320 may perform this check every time a change is made to the model (e.g., a block is added or modified). Additionally or alternatively, graphical model creation component 320 may make this check periodically or in response to an explicit user command. Techniques for verifying that a block or section of code does not influence other parts of a system are known and will not be described further herein.

Figure 8:
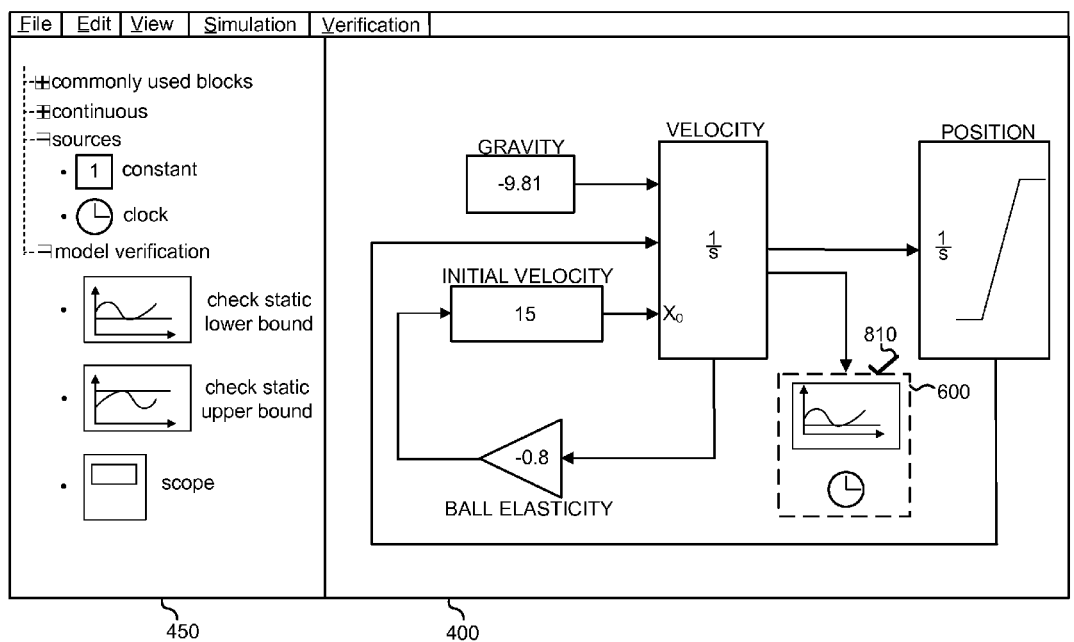
FIGS. 8 and 9 are diagrams of exemplary user interfaces illustrating additional verification subsystems defined for a model.

In some implementations, graphical model creation component 320 may visually indicate the completeness of a verification activity for a verification subsystem. For example, a verification subsystem may display a checkmark or other graphical indicator, or may change some other aspect of its visual appearance to indicate completion of a verification activity. FIG. 8 is a diagram of an exemplary user interface illustrating a verification subsystem 600 defined for a model. The model shown in FIG. 8 is identical to that shown in FIG. 6, except that verification subsystem 600 is shown as including a checkmark 810. Checkmark 810 may indicate that a verification activity is complete for verification subsystem 600.

Figure 9:
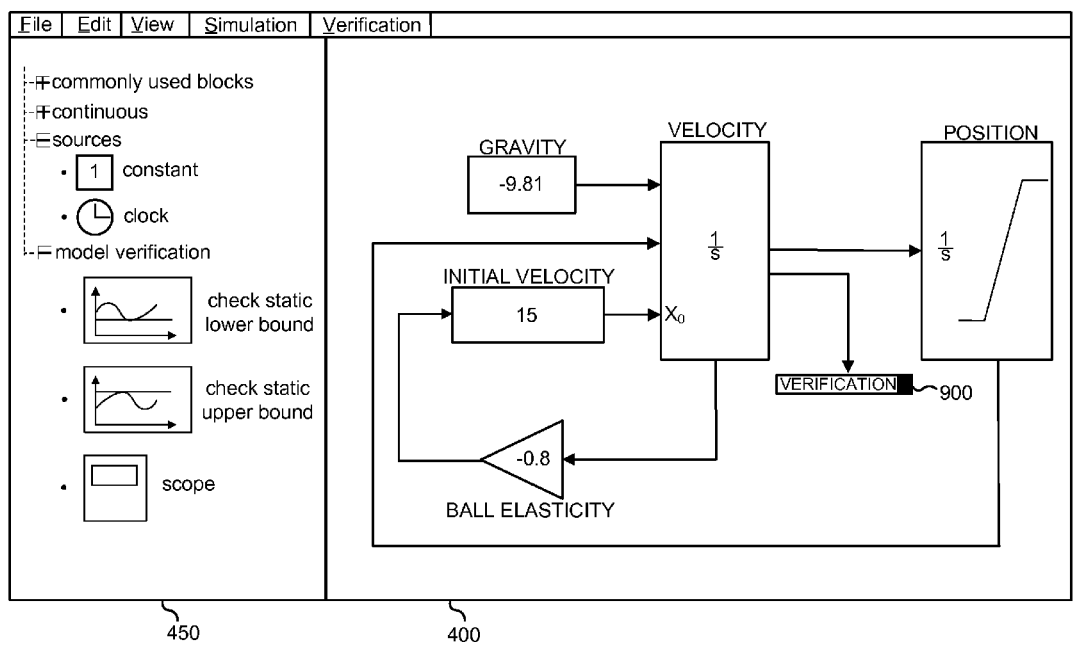

In still other implementations, a verification subsystem may, at certain times, be visually hidden or be displayed with a reduced visibility to the user. For example, the user may explicitly select that a verification subsystem be hidden or shown with reduced visibility. In other implementations, graphical model creation component 320 may include an "auto-hide" feature in which the verification subsystem may be hidden from user view if graphical model creation component 320 determines that the user is performing activities not related to verification and validation. FIG. 9 is a diagram of an exemplary user interface illustrating a verification subsystem 900 defined for a model. Assume that verification subsystem 900 is defined identically to verification subsystem 600. In this example, however, verification subsystem 900 is shown in a "minimized" (reduced visibility mode). The user may switch back to the non-minimized view by, for example, selecting a portion of the icon that represents verification subsystem 900.

In some situations, graphical model creation component 320 may, in performing a verification activity for a verification subsystem, determine that one or more blocks in the verification subsystem affect the output of the model. For example, a block in the verification subsystem may attempt to write a result to a block outside of the verification subsystem. In these situations, graphical model creation component 320 may generate and output an error condition or otherwise inform the user of the block that is inappropriately writing to the model. Additionally, in some implementations, graphical model creation component 320 may allow a user to enable and disable blocks contained in the verification subsystems. For example, a user may configure certain blocks within a verification subsystem to be automatically disabled based on the complexity or completeness of the verification being performed.

As described above, verification subsystems may be defined in a model that operate as a container that guarantees objects in the container do not affect the behavior of a model or affect the code generated to implement the model. Arbitrary objects available in graphical model creation component 320 may be placed in the verification subsystem. In this manner, flexibility and the full programming power of the technical computing environment can be made available to the user when designing verification subsystems to determine whether a model is functioning correctly. A verification subsystem may itself be thus treated as a model.

Verification Interface

Graphical model creation component 320 may allow users to define interfaces for models. The interfaces generally may define the signals or variables output from or required by (i.e., consumed) a model.

Figure 10:
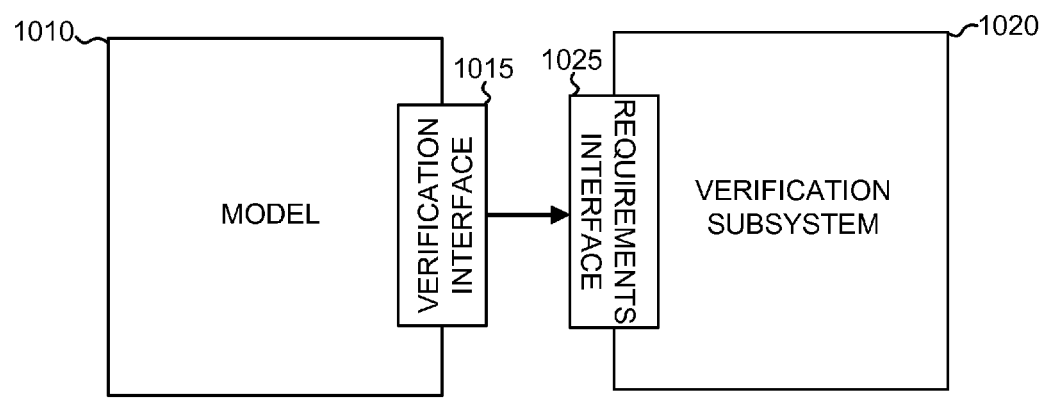
FIG. 10 is a diagram illustrating interactions between a verification interface of a model and a requirements interface of a verification subsystem.

FIG. 10 is a diagram conceptually illustrating interactions between a verification interface of a model and a requirements interface of a verification subsystem. A user may define a model 1010 and a verification subsystem 1020. The verification subsystem may itself be a model. Interfaces may also be defined for model 1010 and verification subsystem 1020, labeled as verification interface 1015 and requirements interface 1025, respectively.

Verification interface 1015 may specify variables and/or signals that are included in the interface. Conceptually, verification interface 1015 may be thought of as defining test points or pads on model 1010 at which signals or variables are to be monitored. A verification interface may be defined by, for example, a combination of: port names, data names, logging names, model hierarchy, and/or explicit tagging.

Although verification interface 1015 is shown as corresponding to a single model 1010 in FIG. 10, a verification interface for a model may correspond to an interface for multiple models. That is, multiple models may contribute to a verification interface. Further, models can define a subset or a superset of another model's verification interface.

In some implementations, verification interface 1015 may only be available when model 1010 is being used for certain purposes. For instance, optimizations or other operations may hide or eliminate elements of verification interface 1015.

Verification subsystem 1020 may be designed as a requirements model that may consume the data produced by model 1010. Requirements interface 1025 may be defined to specify the data required by verification subsystem 1020. Requirements interface 1025 may have a purely read-only view of model 1010.

Based on the explicit definition of verification interface 1015 and requirements interface 1025, graphical model creation component 320 may automatically determine whether model 1010 can be tested by verification subsystem 1020. More specifically, model 1010 and verification subsystem 1020 may be determined to be compatible with one another when verification interface 1015 defines the interface or a superset of the interface of requirements interface 1025. A requirements model defined by verification subsystem 1020 may be compatible with any design model in which the interface for the model is compatible with the interface for the verification subsystem. In this situation, graphical model creation component 320 may analyze the design model, based on the requirements model, to obtain requirements results for the user. Also, there may be a many to many relationship between models 1010 and corresponding verification subsystems.

In some implementations, requirements interface 1025 may define default values for certain interface inputs. This may have the effect of expanding the set of compatible verification interfaces.

CONCLUSION

A verification tool in a graphical model creation component was described herein that may provide for the full expressive power of the graphical modeling system to be used to define error or exceptional conditions without adverse affects on the ultimate implementation of the model.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be modified in other implementations. Further, non-dependent acts may be performed in parallel.

Also, the term "user" has been used herein. The term "user" is intended to be broadly interpreted to include a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
presenting a graphical interface, wherein the graphical interface is to facilitate design, by a user, of a model constructed from two or more of a plurality of graphical blocks;
receiving, via the graphical interface, an association of a plurality of blocks, from the plurality of graphical blocks, with a verification subsystem associated with a desired behavior of the model;
performing, based on the verification subsystem, a first operation to verify the desired behavior of the model;
automatically disabling one or more of the plurality of blocks associated with the verification subsystem based on at least one of a complexity or a completeness of the first operation; and
performing a second operation to verify that the plurality of blocks in the verification subsystem do not affect operation of the model.

2. The method of claim 1, further comprising:
outputting an error indication when a result of the second operation indicates that at least one block, of the plurality of blocks in the verification subsystem, affects operation of the model outside of the verification subsystem.

3. The method of claim 1, wherein performing the second operation further includes:
verifying that the plurality of blocks in the verification subsystem do not influence an output of the model.

4. The method of claim 1, wherein performing the second operation further includes:
verifying that the plurality of the blocks in the verification subsystem do not influence code generated to implement the model.

5. The method of claim 1, wherein one or more of the plurality of graphical blocks is associated with performing the first operation to verify the desired behavior of the model; and
wherein the plurality of blocks in the verification subsystem differ from the one or more of the plurality of graphical blocks associated with performing the first operation.

6. The method of claim 1, further comprising:
displaying the plurality of blocks associated with the verification subsystem, including graphically indicating that the plurality of blocks are associated with the verification subsystem.

7. The method of claim 1, further comprising:
providing a visual indication that the plurality of blocks are associated with the verification subsystem.

8. The method of claim 7, wherein providing the visual indication further comprises:
displaying a visual indicator to indicate completeness of the second operation.

9. The method of claim 7, wherein providing the visual indication further comprises:
reducing a displayed visibility of the visual indication when the user is performing activities unrelated to the second operation.

10. The method of claim 1, further comprising:
defining, via the graphical interface, an interface for the verification subsystem, the interface specifying at least one of variables or signals that are output from or required by the verification subsystem.

11. A non-transitory computer-readable medium that stores computer-executable instructions for:
presenting a graphical interface, wherein the graphical interface is to facilitate design, by a user, of a model constructed from two or more of a plurality of graphical blocks;
grouping a plurality of blocks, of the plurality of graphical blocks, to define a verification subsystem that specifies a desired behavior of the model, the plurality of blocks differing from one or more blocks, of the plurality of graphical blocks, designed specifically for at least one of verification or validation of the model;
performing, based on the verification subsystem, a first operation to verify the desired behavior of the model;
disabling one or more of the plurality of blocks, in the verification subsystem, based on at least one of a complexity or a completeness of the first operation; and
performing a second operation to verify that the plurality of blocks in the verification subsystem do not affect operation of the model.

12. The computer-readable medium of claim 11, wherein performing the second operation further includes:
verifying that the blocks in the verification subsystem do not influence code generated to implement the model.

13. A system, comprising:
a processor to:
facilitate graphical construction of a model defined by a first plurality of blocks and connections among the first plurality of blocks;
provide for graphical selection of a second plurality of blocks, by a user, to specify a desired behavior of the model, wherein the second plurality of blocks form a verification subsystem;
perform a first operation to verify the desired behavior of the model;
disable one or more of the second plurality of blocks, that form the verification subsystem, based on at least one of a complexity or a completeness of the first operation; and
perform a second operation to verify that the second plurality of blocks, in the verification subsystem, do not affect operation of the model.

14. The system of claim 13, wherein the system implements a technical computing environment.

15. The system of claim 13, wherein the processor is further to:
output an error indication in response to determining, during the second operation, that at least one block, of the second plurality of blocks in the verification subsystem, affects operation of the model outside of the verification subsystem.

16. The system of claim 13, wherein the processor, when performing the second operation, is further to:
verify that the blocks in the verification subsystem do not influence an output of the model.

17. The system of claim 13, wherein the processor, when performing the second operation, is further to:
verify that the blocks in the verification subsystem will not influence code generated to implement the model.

18. The system of claim 13, wherein none of the second plurality of blocks in the verification subsystem are designed specifically for verification or validation of the model.

19. The system of claim 13, wherein one or more of the second plurality of blocks is selected from the first plurality of blocks defining the model.

20. The system of 13, wherein the processor is further to:
display the second plurality of blocks, including graphically indicating that the second plurality of blocks is included in the verification subsystem.

21. The system of 13, wherein the processor is further to:
display a visual indicator to indicate completeness of the second operation.

22. The system of 13, wherein the processor is further to:
provide a visual indication of the verification subsystem, including reducing a displayed visibility of the visual indication of the verification subsystem when the user is performing activities unrelated to the first second operation or the second operation.

23. The system of claim 13, wherein the processor is further to:
receive a definition of an interface for the verification subsystem, the interface including a specification of variables or signals that are output from or required by the verification subsystem.

24. A device comprising:
means for presenting a graphical interface to facilitate design of a model constructed from a first plurality of graphical blocks;
means for receiving an association of a second plurality of graphical blocks with a verification subsystem that specifies a desired behavior of the model;
means for performing a first operation to verify the desired behavior of the model;
means for disabling one or more of the second plurality of blocks, associated with the verification subsystem, based on at least one of a complexity or a completeness of the first operation; and
means for performing a second operation to verify that functions associated with the second plurality of graphical blocks in the verification subsystem do not affect operation of the model.

* * * * *

UNITED STATES PATENT AND TRADEMARK OFFICE
CERTIFICATE OF CORRECTION

| | | |
|---|---|---|
| PATENT NO. | : 7,941,299 B1 | Page 1 of 1 |
| APPLICATION NO. | : 11/970689 | |
| DATED | : May 10, 2011 | |
| INVENTOR(S) | : William J. Aldrich et al. | |

It is certified that error appears in the above-identified patent and that said Letters Patent is hereby corrected as shown below:

Column 13, claim 22, line 12, delete the word "second".

Signed and Sealed this
Fifth Day of July, 2011

David J. Kappos
*Director of the United States Patent and Trademark Office*